United States Patent
Zhu et al.

(10) Patent No.: US 9,451,627 B1
(45) Date of Patent: Sep. 20, 2016

(54) SINGLE TRANSCEIVER-DSA VIA MAC-UNDERLAY SENSING AND SIGNALING

(71) Applicant: SILVUS TECHNOLOGIES, INC., Los Angeles, CA (US)

(72) Inventors: Weijun Zhu, Calabasas, CA (US); Phillip James Duncan, Long Beach, CA (US); Mansour Rachid, Los Angeles, CA (US); Gaelen Stanislaus Pereira, Los Angeles, CA (US); Yi Jiang, San Diego, CA (US)

(73) Assignee: Silvus Technologies, Inc., Los Angeles, CA (US)

(*) Notice: Subject to any disclaimer, the term of this patent is extended or adjusted under 35 U.S.C. 154(b) by 0 days.

(21) Appl. No.: 14/970,150

(22) Filed: Dec. 15, 2015

Related U.S. Application Data

(60) Provisional application No. 62/092,715, filed on Dec. 16, 2014.

(51) Int. Cl.
  *H04W 4/00* (2009.01)
  *H04W 72/08* (2009.01)
  *H04W 16/14* (2009.01)

(52) U.S. Cl.
  CPC ........... *H04W 72/082* (2013.01); *H04W 16/14* (2013.01)

(58) Field of Classification Search
  CPC ..................... H04W 74/0816; H04W 74/0808
  See application file for complete search history.

(56) References Cited

U.S. PATENT DOCUMENTS 5,418,784 A   5/1995  Ramakrishnan et al.
5,436,903 A   7/1995  Yang et al.
6,038,225 A   3/2000  Nago (Continued)

FOREIGN PATENT DOCUMENTS

EP   2088811 A1   8/2009
EP   1603283 B1   9/2010

(Continued)

OTHER PUBLICATIONS

Boksiner, et al., "Centrally Controlled Dynamic Spectrum Access for MANETs" 2013 IEEE Military Communications Conference, IEEE Computer Society, 978-0-7695-5124, pp. 641-646, Milcom, Jan. 2013.

(Continued)

*Primary Examiner* — Maharishi Khirodhar
(74) *Attorney, Agent, or Firm* — Knobbe, Martens, Olson & Bear, LLP

(57) ABSTRACT

A wireless communication system may include a plurality of nodes that use a medium access control (MAC) protocol to communicate over a shared medium or a primary channel. The MAC protocol may include a non-transmitting state during which one or more nodes are silent in the primary channel while two nodes in the wireless communication system are in communicating over the primary channel. Systems and methods described herein use medium access protocol (MAC) underlay signaling, which may include measuring or sensing availability for spectrum or transmitting data without the loss of network throughput over a secondary channel in a wireless communications system. In some embodiments, the systems and methods described herein use dynamic spectrum access (DSA) protocols to switch the channel of communication in the wireless communication system.

16 Claims, 13 Drawing Sheets

(56) References Cited

U.S. PATENT DOCUMENTS

| | | |
|---|---|---|
| 6,556,582 B1 | 4/2003 | Redi |
| 6,754,176 B1 | 6/2004 | Gubbi et al. |
| 6,788,658 B1 | 9/2004 | Bims |
| 6,980,561 B1 | 12/2005 | Abi-Nassif |
| 8,107,966 B2 * | 1/2012 | Choi .................... H04W 48/12 |
| | | 370/328 |
| 8,160,090 B2 | 4/2012 | Yoshizawa et al. |
| 8,462,709 B2 | 6/2013 | Nanda et al. |
| 8,483,620 B2 | 7/2013 | Horn et al. |
| 8,588,091 B2 | 11/2013 | Trainin |
| 8,837,435 B2 | 9/2014 | Singh et al. |
| 8,861,445 B2 | 10/2014 | Jing et al. |
| 8,879,573 B2 | 11/2014 | Bahl et al. |
| 8,913,597 B2 | 12/2014 | Benveniste |
| 9,014,207 B2 | 4/2015 | Goel et al. |
| 9,094,986 B2 | 7/2015 | Horn et al. |
| 9,173,235 B2 * | 10/2015 | Lim .................... H04L 27/0006 |
| 2004/0071154 A1 | 4/2004 | Wentink |
| 2004/0240426 A1 | 12/2004 | Wu et al. |
| 2009/0262688 A1 | 10/2009 | Tsai et al. |
| 2012/0082040 A1 | 4/2012 | Gong et al. |
| 2012/0327870 A1 | 12/2012 | Grandhi et al. |
| 2013/0058222 A1 | 3/2013 | Ben-Yehezkel et al. |
| 2013/0163575 A1 | 6/2013 | Pak et al. |
| 2013/0201857 A1 | 8/2013 | Bhargava et al. |
| 2014/0050203 A1 | 2/2014 | Doppler et al. |
| 2014/0079016 A1 | 3/2014 | Dai et al. |
| 2014/0169290 A1 | 6/2014 | Seok |
| 2014/0328265 A1 | 11/2014 | Sampath et al. |
| 2015/0245282 A1 | 8/2015 | Kim et al. |
| 2015/0264689 A1 * | 9/2015 | Sampath ........... H04W 72/0453 |
| | | 370/329 |

FOREIGN PATENT DOCUMENTS

| | | |
|---|---|---|
| EP | 2744292 A1 | 6/2014 |
| EP | 2866514 A2 | 4/2015 |
| KR | 2006010018 A | 2/2006 |
| WO | WO2005039105 A1 | 4/2005 |
| WO | WO2006106459 A1 | 10/2006 |
| WO | WO2007098136 A2 | 8/2007 |
| WO | WO2011129634 A3 | 1/2012 |
| WO | WO2014124131 A2 | 8/2014 |

OTHER PUBLICATIONS

Jones et al., "A Dynamic Spectrum Access Mac Applique for Legacy Military Radios" The John Hopkins University Applied Physics Laboratory, 978-1-4244-2677, pp. 1-5, Milcom, May 2008.

Kumar et al., "Medium Access Control Protocol for AD-HOC Wireless Networks: A Survey" Electrical and Computer Engineering Department, Clarkson University, Embedded Software for Digital Televisions Group, ATI Research, and Department of Computer Science, University of New Orleans, pp. 1-54, 2004.

Marinho et al., "Cognitive Radio: Survey on Communication Protocols, Spectrum Decision Issues, and Future Research Directions" Wireless Netw, vol. 18, pp. 147-164, 2012.

Nasipuri, et al., "Performance of Multichannel Wireless Ad HOC Networks" Int. J. Wireless and Mobile Computing, vol. 1, Nos. ¾, pp. 191-203, 2006.

Park et al., Performance of Joint Spectrum Sensing and MAC Algorithms for Multichannel Opportunistic Spectrum Access Ad Hoc Networks, IEEE Transactions on Mobile Computing, vol. 10, No. 7, pp. 1011-1027, Jul. 2011.

Perich et al., "Efficient Dynamic Spectrum Access Implementation" The 2010 Military Communications Conference—Unclassified Program—Networking Protocols and Performance Track, 978-1-4244-8180, pp. 1887-1892, Apr. 2010.

Redi, et al., "The DARPA WNaN Network Architecture" The 2011 Military Communications Conference—Track 6—Department of Defense Programs, 978-1-4673-0081, pp. 2258-2263, 2011.

Seelig, et al. "A Description of the Aug. 2006 XG Demonstrations at Fort A. P. Hill" U.S. Department of Defense Advanced Research Projects Agency, 1-4244-0663, pp. 1-12, Mar. 2007.

Shiang et al., "Distributed Resource Management in Multihop Cognitive Radio Networks for Delay-Sensitive Transmission" IEEE Transactions on Vehicular Techonology, vol. 58, No. 2, pp. 941-953, Feb. 2009.

Ye, et al., "An Energy-Efficient MAC Protocol for Wireless Sensor Networks" Information Science Institute, University of Southern California Computer Science Department, 2011.

Yucek et al., "A Survey of Spectrum Sensing Alforithms for Cognitive Radio Applications" IEEE Communications Surveys & Tutorials, vol. 11, No. 1, pp. 116-130, 2009.

Zhao et al., "A Survey of Dynamic Spectrum Access" IEEE Signal Processing Magazine 1053-5888, pp. 79-89, May 2007.

Zhao et al., "Decentralized Cognitive MAC for Opportunistic Spectrum Access in Ad Hoc Networks: A POMDP Framework" IEEE Journal on Selected Areas in Communications, vol. 25, No. 3, pp. 589-600, Apr. 2007.

The Mac Level (link layer), downloaded on Dec. 7, 2015 from website: http://www.labs.hpe.com/personal/Jean_Tourrilhes/Linux/Linux.Wireless.mac.html, 2000.

* cited by examiner

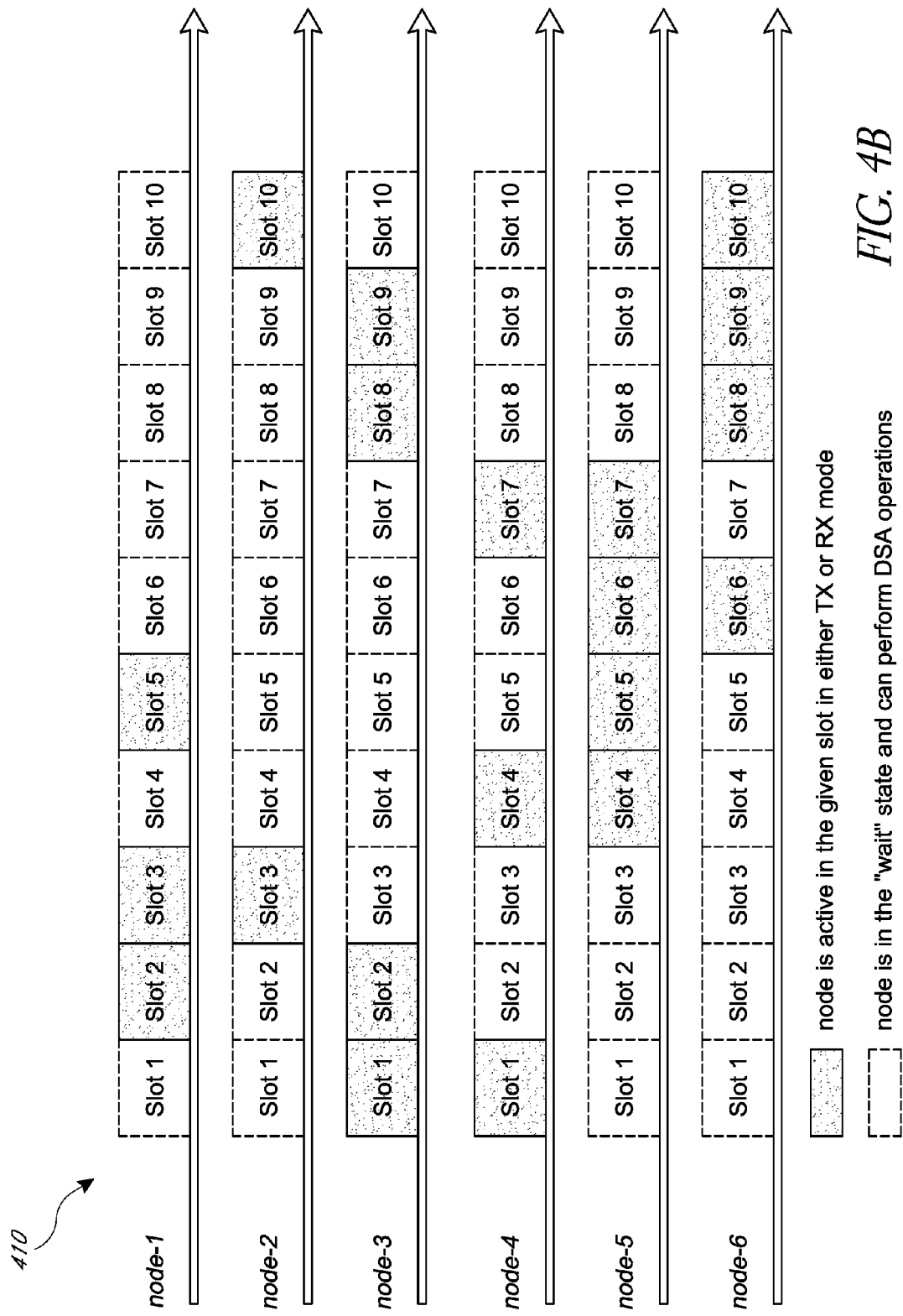

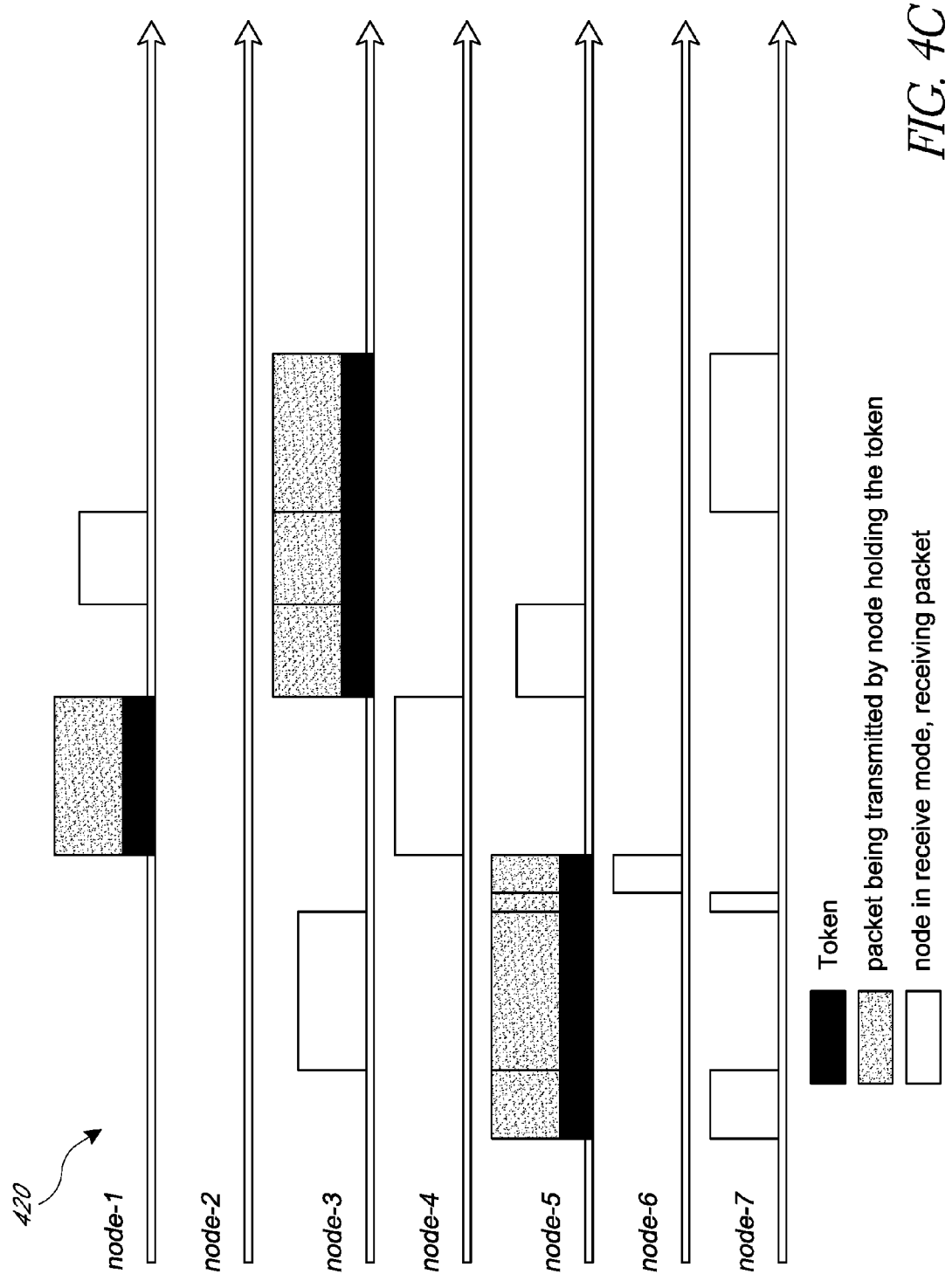

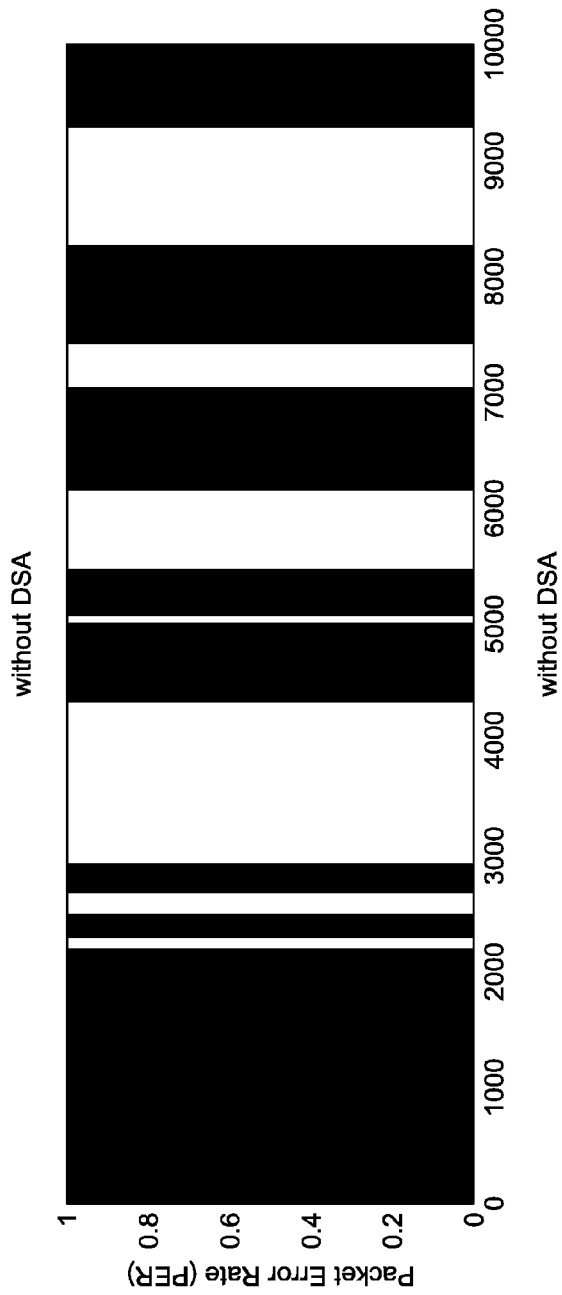
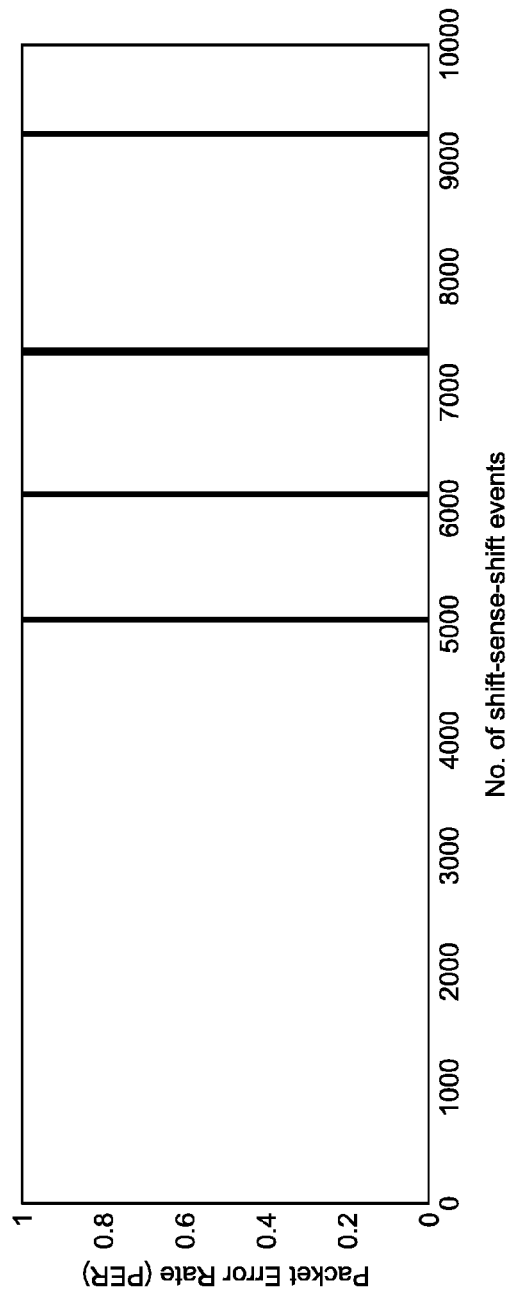
FIG. 7A
FIG. 7B

T$_{on}$ for channels 1, 2 and 3 measured in shift-sense-shift intevals
(t$_{on}$ for channels 4&5 was set to be higher than that of chan 1-3)

SINGLE TRANSCEIVER-DSA VIA MAC-UNDERLAY SENSING AND SIGNALING

INCORPORATION BY REFERENCE OF RELATED APPLICATION

This application claims the benefit of U.S. Provisional Patent Application No. 62/092,715, filed Dec. 16, 2014, titled SINGLE TRANSCEIVER-DSA VIA MAC-UNDERLAY SENSING AND SIGNALING, the entire contents of which are incorporated by reference and made a part of this specification.

BACKGROUND

1. Technical Field

This disclosure relates to management of wireless communication systems.

2. Description of Related Art

Wireless communication systems are widely deployed to provide various types of communication (e.g., voice, data, multimedia services, etc.) to multiple users. As the demand for various types of wireless communication grows, there lies a challenge to implement efficient and robust communication systems. Over the past decade the research community has generated thousands of papers dealing with many different aspects of dynamic spectrum access (DSA), cognitive radios and opportunistic networking. DSA refers to moving portions or all of the network communications into one or more unused channels to balance out the demands of a network. A number of DSA technologies have a negative impact on network throughput and/or require new waveforms and new hardware architecture.

SUMMARY

For purposes of summarizing the disclosure, certain aspects, advantages and novel features have been described herein. It is to be understood that not necessarily all such advantages can be achieved in accordance with any particular embodiment disclosed herein. Thus, the embodiments disclosed herein can be embodied or carried out in a manner that achieves or optimizes one advantage or group of advantages as taught or suggested herein without necessarily achieving others.

In some embodiments, a system for performing secondary operations during data communications over a shared medium is provided. The system can include a first networking device that can transmit a signal over a primary channel in accordance with a media access control ("MAC") protocol, the signal indicating a transmission request to a second networking device. The system can further include a second networking device that can receive the transmission request from the first networking device over the primary channel. The system can also include a third networking device, including a memory. The third networking device can receive the transmission request from the first networking device over the primary channel. In an embodiment, the third networking device can operate in a non-transmitting state in the primary channel in response to receiving the transmission request from first networking device. Further, the third networking device can perform a secondary operation during the non-transmitting state in a secondary channel different from the primary channel. In an embodiment, the secondary operation can include at least one of a plurality of dynamic spectrum access (DSA) operations and the third networking device performs one of the plurality of DSA operations while it is not transmitting in the primary channel to avoid collisions with communications occurring between the first networking device and the second networking device. In some embodiments, the DSA operations include shift to one of a plurality of secondary frequencies that do not interfere with the signal in the primary channel, sense interference in the shifted channel and store the interference corresponding to the shifted channel in the memory, and transmit stored interference from the memory to at least some of the networking devices. Further, in some embodiments, at least one of the first, second, or third networking devices or a centralized controller is further configured to determine that one of the plurality of secondary frequencies are available for communications based on the transmitted stored interference and shift the primary channel to the available secondary channel when there is interference in the primary channel. Accordingly, in some embodiments, a dedicated antenna is not needed for DSA because the third networking device performs the secondary operation while it is supposed to stay idle in the primary channel, thereby enabling dynamic spectrum access without the dedicated antenna.

In some embodiments, a system for performing secondary operations during data communications over a shared medium can include a memory, an antenna, and a transceiver. The system can further include a hardware processor. In an embodiment, the hardware processor can receive a request over a primary channel at the transceiver, the request including a message corresponding to a request to send data. The hardware processor can operate in a non-transmitting state in the primary channel based on the received request. Further, the hardware processor can perform a secondary operation during the non-transmitting state in a secondary channel different from the primary channel.

In some embodiments, a method of performing secondary operations during data communications over a shared medium is disclosed. The method can include receiving a first signal over the primary channel. The method can further include staying idle in the primary channel for a first time in response to the first signal. Moreover, the method can further include performing an operation corresponding to measuring or sensing availability for spectrum or transmitting data without the loss of network throughput over a secondary channel in a wireless communications system using a medium access protocol that includes a non-transmitting state during which one or more nodes are otherwise to be silent in the primary channel.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIG. 4B illustrates a process for MAC underlay signaling in a network system using TDMA MAC protocol according to an embodiment of the disclosure.

FIG. 4C illustrates a process for MAC underlay signaling in a network system using Token Passing MAC protocol according to an embodiment of the disclosure.

FIGS. 7A and 7B illustrate, for an example network system, packet error rate without using DSA and with using MAC underlay DSA, respectively.

DETAILED DESCRIPTION

Figure 1:
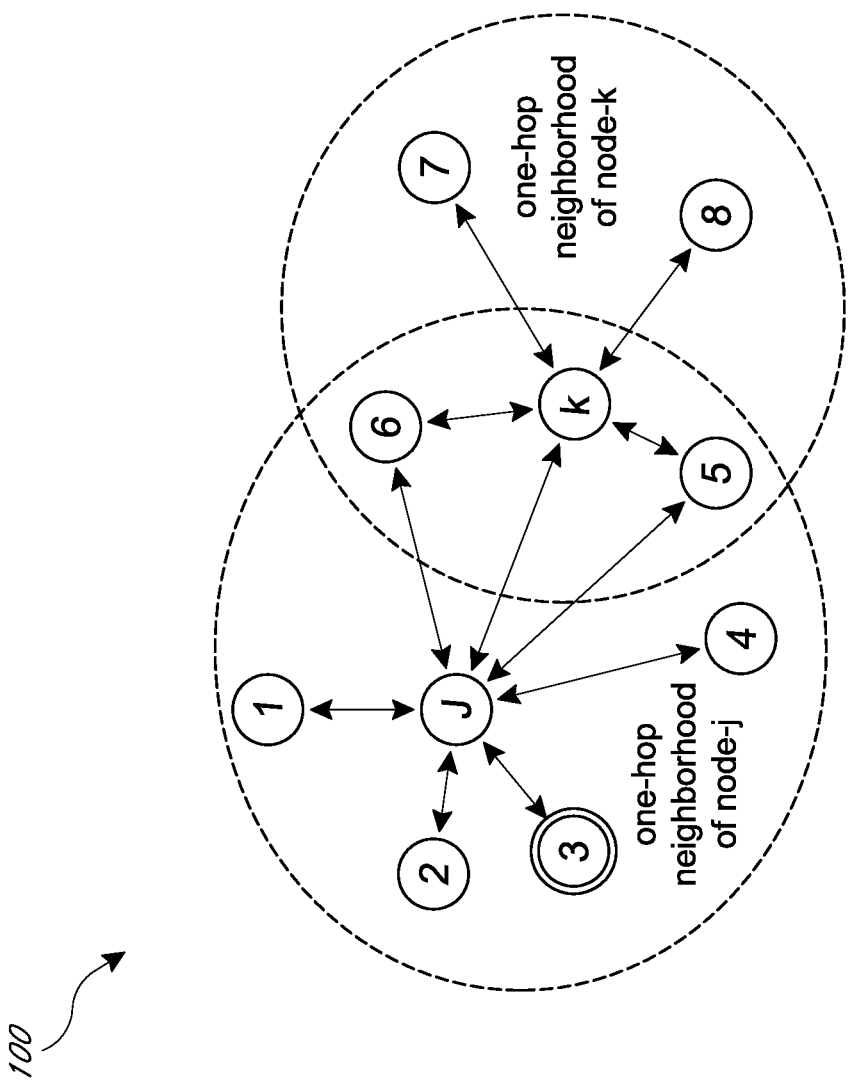
FIG. 1 illustrates an embodiment of a network system including multiple nodes or network devices for communicating data.

In some instances, existing hardware for networking might be limited to a single transceiver. A transceiver can include a dedicated transmitter, or receiver attached to an antenna. Even if the hardware includes multiple transceivers, it may not have a dedicated transceiver to measure the spectrum. The military has thousands of these legacy radios with a single transceiver that need to function in difficult environments. The use of video has also increased demands on the network. Further, the radios deployed in the field can encounter jammers or interference from enemy or friendly sources. In some cases, soldiers may get deployed into a particular area and the radios may be set up before the mission. However, the area might already include a transmitter operating on the same frequency as the soldier's radios. Accordingly, in some instances, it may be advantageous to have the radios adapt on the fly. The old legacy radios, however, may not have the functionality to adapt. Moreover, upgrading these radios and getting them into the field for military use may take as long as a decade. Accordingly, some of embodiments of the systems and methods described herein enable old legacy radios to adapt on the fly without requiring any hardware modification. The disclosure described herein is not limited to just military radios and can be implemented with other types of legacy radios or new radios with certain design constraints like cost or power.

I. Mobile Ad-Hoc Network (MANET)

Networks that use cellular or WiFi technology may utilize a central 'hub' node to deliver high speed connectivity and good quality of service (QoS) to a user. However, the centralized control infrastructure may not be available in some environments. There are many instances where a network may operate with a group of nodes communicating with each other on an ad-hoc basis without centralized control. For example, in a military operation, it may not be ideal to set up an infrastructure with centralized hub in a dynamic field setting where nodes may be coming in and out. Nodes may refer to any device or instrument with an antenna. Furthermore, some environments may include jamming devices or interference sources that cannot be eliminated. Removing the centralized hub and adding mobility coupled with time varying connectivity profile without adversely affecting the user's QoS (Quality of Service) can be a formidable challenge faced by developers of wireless mesh networking (also called mobile ad hoc networking or MANET). A MANET system can include any group of mobile (or temporarily stationary) devices which may provide ability to stream voice, data, and video between arbitrary pairs of devices utilizing the others as relays to avoid the need for infrastructure.

II. Dynamic Spectrum Access (DSA)

In many networking systems including multiple nodes, the nodes may share a limited number or in some cases a single channel for communication with other nodes of the network. A channel may correspond to a frequency of communication. In these systems, other unoccupied channels may be available for communication but not used by the network. The situation can be analogized to driving on a highway where all the cars are forced to travel in one lane where another lane is open and available for use. Dynamic Spectrum Access (DSA) refers to moving portions or all of the network communications into one or more unused channels to balance out the demands of a network. However, moving into a second channel from a first channel may require information about the second channel. Unlike highways, where a driver can see that the second lane is open, moving between channels may require first sensing the state of available channels. Sensing may include detecting interference in the second channel or detecting whether another network is operating in the second channel. In general, sensing can determine the state of a channel. Further, the sensed information may be shared among the nodes of the network and possibly updated periodically. Using the sensed states of different channels, some or all of the communications between nodes may be moved from one channel to another channel to improve overall network efficiency. For example, if the interference in the first channel is too high or if there is additional bandwidth required, some or all of the communications in the first channel can be moved to a second available channel with higher throughput than the first channel.

Many DSA schemes use new waveforms or new hardware architectures such as a dedicated transceiver for sensing and transmitting channel information. However, for the large number of legacy networking equipment, such modification may not be feasible. For example, the military uses legacy radios such as SRW/Rifleman radio that only has a single transceiver and/or antenna. DSA schemes that require modification of or new hardware ignore the significant investment already made in the legacy equipment and the decade long pipeline of program of record (PoR) approved equipment that is yet to be implemented in the field. For example, the WNaN system implements DSA with new multi-transceiver radios and network protocols, while the XG program requires additional hardware units and/or the interruption of legacy radio/network operation to achieve DSA capability. Some DSA implementations may also require centralized control which may not always be avoidable. Existing DSA schemes may also take time away from data communication for sensing and transmitting channel information. This can have a negative impact on the network throughput rate and may not be suitable for all implementations.

Accordingly, in some instances, it may be advantageous to enable DSA capability without modifying existing hardware or using dedicated transceivers or taking time away from data communications. Implementing DSA in the legacy radios with a single transceiver or with no dedicated DSA transceiver may be challenging. The DSA sense and transmit may take important time away from data transmission and decrease throughput of the network. Throughput may correspond to the fraction of channel capacity that is used for data transmission. Thus, one of the challenges for implementing DSA in legacy radios can be maintaining normal operation of a network while sensing or transmitting states of different channels.

III. Access Control Protocol

As discussed above, the nodes in a network may communicate over a shared medium or channel. Thus, transmission from one node may be received by all the other nodes in a neighborhood of the transmitting node. In some instances, the neighborhood can refer to all the nodes within one hop of the transmitting node. The size or the number of nodes included in the neighborhood can change based on network parameters which may include physical parameters such as distance. Sending and receiving data on a shared channel at the same time can result in a collision and lost data. Thus, nodes in a network using a shared channel for communication between nodes implement a medium access control (MAC) protocol. Access control protocols can define rules for orderly access to the shared medium. Some examples of MAC protocols include CSMA/CA (carrier sense multiple access with collision avoidance), ALOHA or TDMA. The processes described herein can also work with Bluetooth, Push to Talk and other access control protocols.

Implementations of medium access control (MAC) protocols may vary depending on the type of protocol. However, a common characteristic of the MAC protocols is that only one pair of nodes communicate at any given time within a neighborhood of the pair of nodes. FIG. 1 illustrates a network system 100 including multiple nodes or networking devices communicating over a shared medium. In particular, FIG. 1 illustrates nodes in the one-hop neighborhood of the pair of nodes j and k. When node-j wants to communicate with node-k, the system 100 uses a MAC protocol, which may require all the nodes in the neighborhood of nodes j and k to be in a non-transmitting state. In other words, the neighboring nodes may be forced to wait until the transmission from node-j to node-k is complete. For example, in systems employing the CSMA/CA protocol, the neighborhood nodes of the transmitting node may operate in a non-transmitting state in response to a RTS (request to send) message. The term "non-transmitting state" is used in accordance with its broad and ordinary meaning herein, and it can refer to, for example, a state where a node is not transmitting in a particular channel, such as a primary channel. In the non-transmitting state, the node can transmit in channel other than the primary channels. In FIG. 1, 80% of the nodes are in a non-transmitting state during transmission from node-j to node-k. In addition, a majority of nodes may be in an idle backed-off state while waiting for the transmission between node-j and k to terminate.

IV. Example Networking Device

Figure 2:
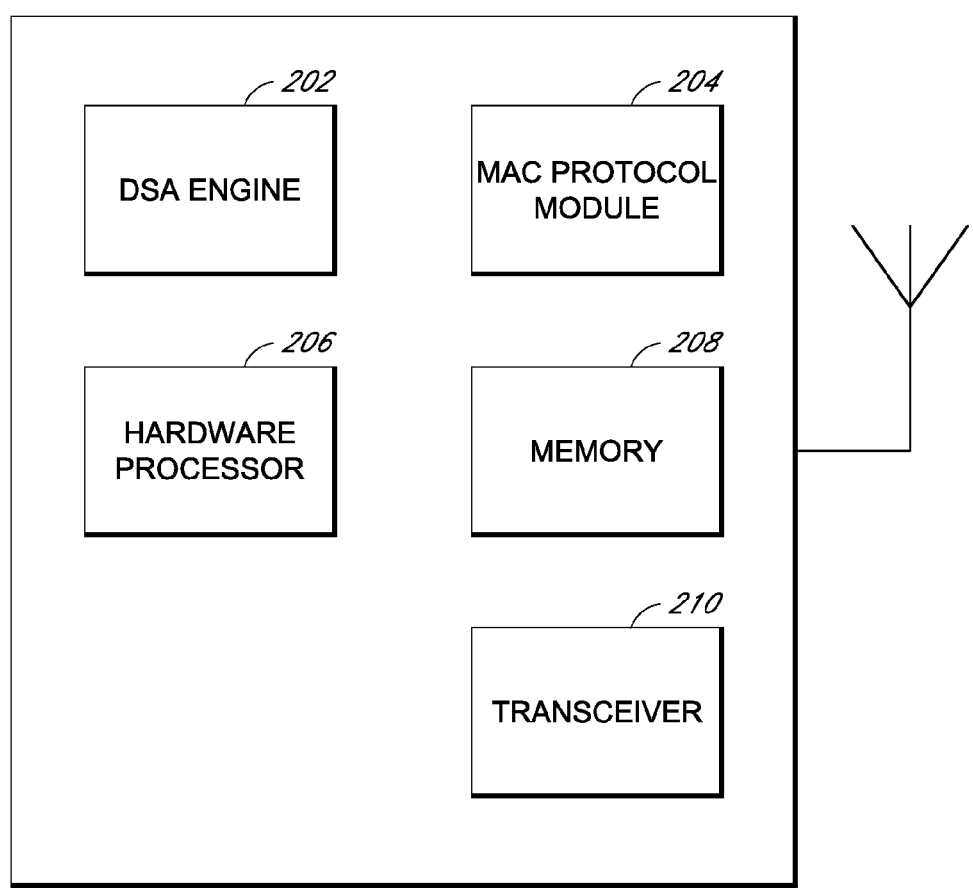
FIG. 2 illustrates an embodiment of a network device system including an antenna for receiving and transmitting data.

FIG. 2 illustrates an embodiment of a networking device 200 including a transceiver 210 and an antenna 220. The networking device 200 can form one of the nodes of a MANET as discussed above. In some embodiments, the networking device 200 can also be a part of a network that includes a centralized hub. The networking device 200 may include legacy radio devices. In some embodiments, the networking device 200 is a Rifleman Radio. In other embodiments, the networking device 200 is a radio that implements one or more of the Institute of Electrical and Electronics Engineers' (IEEE) 802.11 standards, such as, for example a "Wi-Fi" radio. A networking device that implements one or more such IEEE 802.11 standards will be referred to herein as a radio, system, protocol, or technology that has "WiFi." The networking device 200 can include a radio that uses Soldier Radio Waveform (SRW).

The networking device 200 includes an transceiver 210 for transmitting and/or receiving signals. In some embodiments, the networking device 200 can include more than one transceiver (not shown). For example, the networking device 200 may have separate transceivers for receiving and transmitting signals. In some embodiments, the networking device 200 can be a MIMO networking device. The embodiments of DSA implementation described herein can be used with any networking devices using MAC protocols to communicate over a shared medium.

The networking device 200 can include hardware and/or software modules. In the illustrated embodiment, the networking device 200 includes a hardware processor 206 and a memory 208. Further, the networking device 200 includes a DSA engine module 202 and a MAC Protocol module 204. The DSA engine 202 and the MAC protocol module 204 may be implemented in hardware or software or a combination of both. In some embodiments, the hardware processor 206 may execute the DSA engine 202 and the MAC protocol module 204. Further, in some embodiments, the memory 208 can include instructions corresponding to the DSA engine 203 and the MAC protocol module 204. For example, the memory 208 can store commands for operation of the networking device 200, such commands may include commands to change its channel, sense interference, broadcast the interference matrix. The memory 208 can also store channel lookup matrix with the corresponding states of the respective channel. For instance, the memory 208 can store the detected interference in different channels for each of the nodes of the network. The networking device 200 may also include additional modules not shown in the illustrated embodiment. For example, the networking device 200 may include a power source such as a battery.

The MAC protocol module 204 can implement one of the MAC protocols discussed above to communicate between network devices over a shared medium. In one embodiment, the MAC protocol module 204 implements a CSMA-CA protocol described more in detail with respect to FIG. 3 below. The DSA engine 202 can enable DSA in the networking device 200. The DSA engine 202 can work in conjunction with the MAC protocol module 204 to sense and transmit channel information. In some embodiments, the DSA engine 202 can enable DSA in legacy network devices without any hardware modification of the legacy network devices. For example, the DSA engine 202 can enable DSA in a networking device without requiring the networking device to include an additional or a dedicated transceiver. Further, in some embodiments, the DSA engine 202 can enable DSA in networking device without requiring the networking devices to modify its waveforms. For example, the DSA engine 202 may enable DSA without requiring the change of networking protocols such as the MAC protocol used by the wireless network systems. Furthermore, in some embodiments, the DSA engine 202 can enable DSA without requiring additional transceivers and/or without reducing throughput of the network. Accordingly, the DSA engine 202 may enable DSA using N transceivers instead of N+1, where the $N+1^{st}$ transceiver may be a dedicated DSA operations transceiver. As discussed above, instructions for executing the DSA engine 202 can be stored in a memory 208 of a networking device 200. Accordingly, in some instances, the DSA engine 202 can enable DSA in legacy network devices through software or a firmware update.

V. DSA Signaling Without Interrupting Normal Operation

Figure 3:
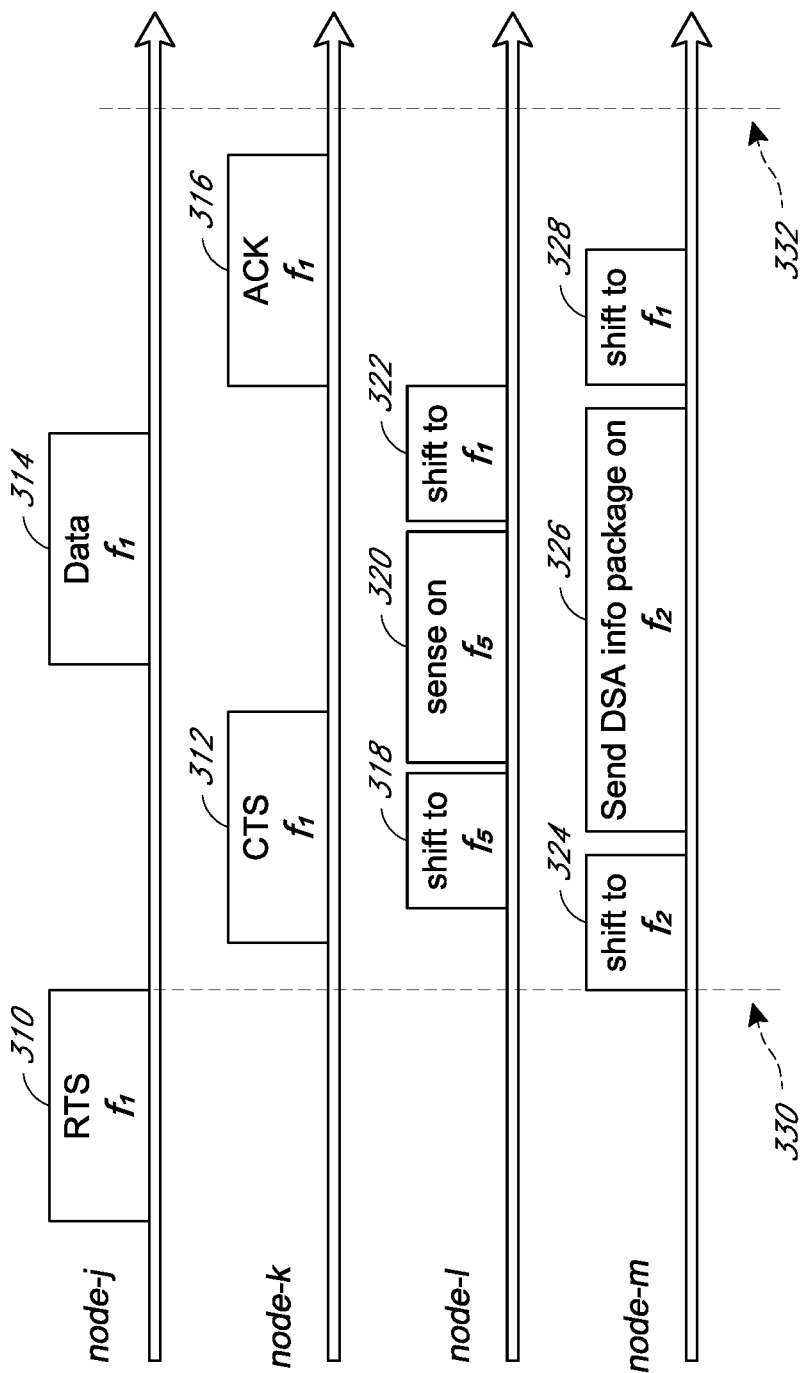
FIG. 3 illustrates a process for MAC underlay signaling in a network system using CSMA/CA MAC protocol.

FIG. 3 illustrates an embodiment of a process 300 for enabling MAC underlay signaling in a group of networking devices. In the illustrated embodiment, each of the nodes (j, k, l, m) correspond to a network device 200. The group of network devices 200 can implement the process 300.

The process 300 can begin at block 310 when node-j attempts to communicate with node-k in a shared medium. As discussed above, a MAC protocol may be used to effectively communicate over a shared medium. In the illustrated embodiment, the MAC protocol is CSMA-CA. Using the CSMA protocol, node-j sends a RTS (request to send) signal to inform the other nodes of its intent to transmit to node-k on a center frequency f1. When the neighboring nodes receive the RTS signal, they are forced into a non-transmitting state until the transmission to node-k is complete. At block 312, when the intended node (here node-k) receives the RTS signal, it can respond with a CTS (clear to send) signal, which can cause node-j to begin the transmission of data at block 314. The remaining nodes in the neighborhood of nodes j and k remain in a non-transmitting state until an ACK signal is transmitted from node-k at block 316. In the illustrated embodiment of the process 300, nodes L and K wait in the non-transmitting state from the end 330 of the RTS signal to the end 332 of the ACK signal. The wait time can be a function of slot times. In another embodiment, the wait time can be a function of the amount of data to be sent from node-j to node-k. In a SRW (soldier radio waveform) system, each slot time is 1.5 ms, or longer, and accordingly the wait time is a minimum of 4.5 ms (3 slots×1.5 ms). In a WiFi system, the wait time is not a function of slot time. It is referred to as the NAV time and is calculated by the transmitting node (in this case node J) and communicated to the network via the RTS packet. During this wait time, the non-transmitting nodes can engage in secondary operations since they have to wait until the ACK message transmission is ended. In an embodiment, the non-transmitting nodes can perform a set of DSA operations, including shift, sense or transmit, during the wait time. Hence, in some embodiments, the process of performing secondary operations while exploiting inherent characteristics of MAC protocols may be referred to as MAC-underlay signaling strategy.

Sense

One of the secondary operations includes sensing state of a channel different than the operating channel. At block 318, after the end of the RTS signal 310, node-1 can shift to channel 5 corresponding to a different frequency than f1. In an embodiment, shifting may require retuning the operating frequency of a particular networking device. The node-1 can then detect the state in channel 5 at block 320. Detecting the state may require sensing the interference floor of the channel. The measured interference can be stored from one or more multiple channels as a sensed vector. In some embodiments, the nodes may not be able to differentiate between friendly or jamming interference. Accordingly, the nodes may measure overall power level in the selected channel. The node-1 can store the interference floor in its memory. Once the sensing is completed, node-1 can return back to channel 1 at block 322. In some embodiments, node-1 can perform a second sense operation on another channel if it has sufficient time before the end 332 of the ACK message. Even in cases where the shift-sense-shift operation is longer than the duration of a transmission, the inherent mechanisms of the MANET and the statistical nature of the MAC underlay process may cause only minimal impact on the overall network throughput Transmit In some embodiments, some of the idle nodes can perform a transmit operation while waiting. During the sense operation, discussed above, the node may save the state of the various channels in its memory 208. The state may include interference levels of the channels. However, only the node that did the sensing may have that information. In some embodiments, it may be advantageous to transmit the sensed information to other nodes of the network. The process 300 illustrates a DSA transmit operation using node-m. For example, at block 324, node-M can shift to a secondary frequency and on an ALOHA basis broadcast its sensed results to any other node that might be sensing on the same secondary channel. In some embodiments, node-M can use native broadcast mechanisms already available in the legacy system. If the nodes in the network shift to different channels on a random basis, then after a number of iterations, it is statistically likely that information about different channels may be sensed and transmitted across the nodes of the network over time. In some embodiments, the non-transmitting nodes may coordinate with each other to decrease the time needed to transmit the sensed information across the nodes. For example, in an embodiment, a central controller may enable coordination or a predetermined pattern of operation may be stored in the networking devices.

The network can exploit the wait time inherent in MAC protocols to perform DSA operations without interrupting network operation. In the process 300, nodes j and k are left to operate on the first channel while the idle nodes operate on other secondary channels. The network devices 200 may store the list of secondary channels to cycle through in its memory 208. The DSA operations of shift-sense-shift and the shift-transmit-shift enable nodes to sense and then communicate the sensed-vectors or matrix (including measured interference floor in the K candidate channels) to the other idle nodes in the network without impacting the normal operation of the network in any way.

DSA Switch

The sensed vectors can be disseminated throughout the network over iterative DSA operations performed on secondary channels during regular network data transmission on the primary channel. In an embodiment, iterative DSA operations may refer to sensing on various channels other than the primary channel. In another embodiment, iterative DSA operations may refer to successive or continuously sensing or transmitting on the secondary channel while two nodes are communicating on the primary channel. Based on the collected sensed vectors or states of other channels, the nodes in the network can use a DSA protocol or policy to determine when to switch and to what frequency to switch. In an embodiment, the nodes switch to a secondary channel when the primary channel is bogged down with increased interference or jamming. The nodes may determine a particular secondary channel based on the collective efficiency of that channel for most of the nodes in the network. In one embodiment, a secondary channel is selected based on the least amount of measured interference floor across the nodes for that channel. Further, the network devices 200 may implement a particular DSA protocol based on the characteristics of their hardware processor 206 and maximizing throughput for that processor. In legacy radios, the primary function of the processor 206 is to run the radio, not the DSA engine 202. Accordingly, the DSA engine 202 can create additional processing for the hardware processor 206. Thus, the complexity of the DSA protocol algorithm to increase network throughput may be balanced with the available processing power on the legacy radios. Complexity of the DSA protocol algorithm may depend on the number of instructions required to implement it on the legacy radio's microprocessor, FPGA, or ASIC.

VI. Validating Timing Constraints

Figure 4A:
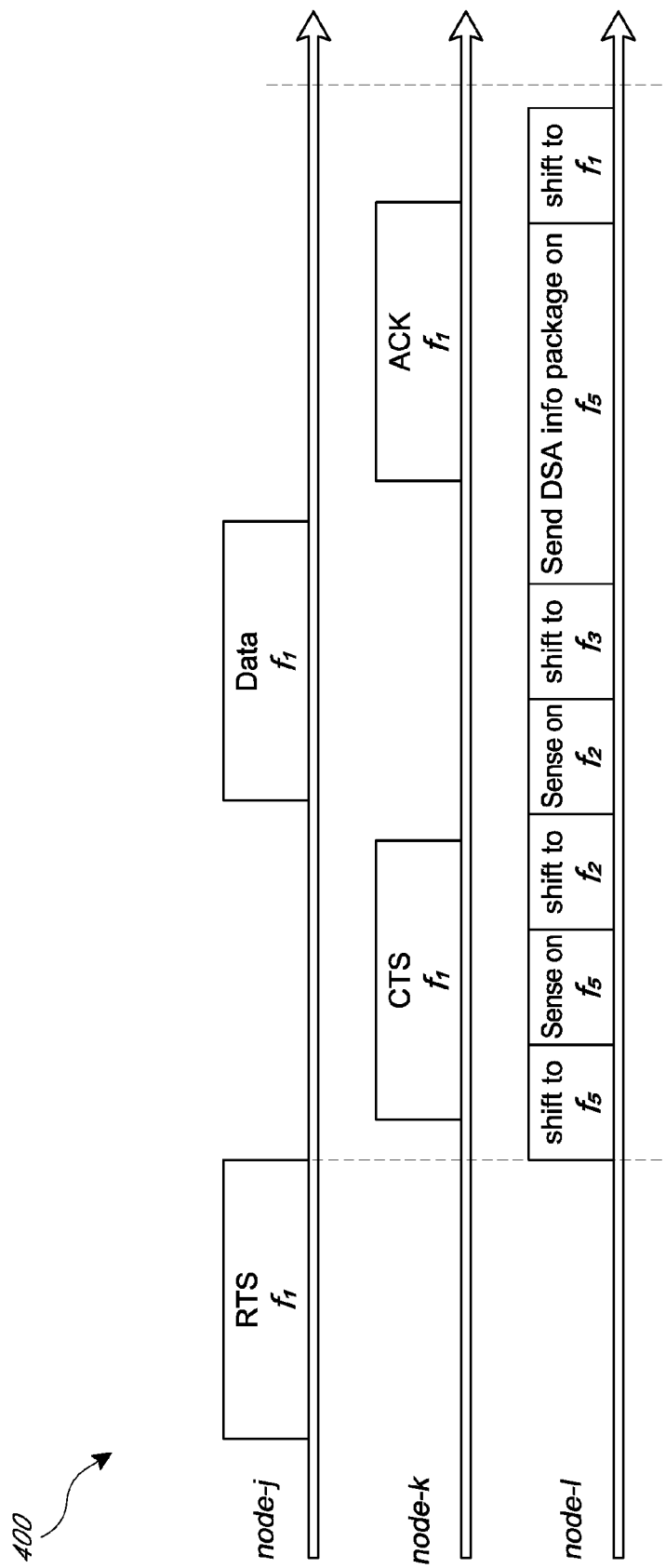
FIG. 4A illustrates a process for MAC underlay signaling in a network system using CSMA/CA MAC protocol in which multiple frequencies are visited during node-1's back-off period according to an embodiment of the disclosure.

As discussed above, in the CSMA scheme, the non-transmitting nodes may have a few milli-seconds to perform the secondary operations such as DSA operations. In an embodiment, the non-transmitting nodes have from 3 to 6 ms, at least 2 ms, 4.5 ms, or another suitable time period. Shifting to a secondary frequency may require returning the frequency of the transceiver 220 in the network device 200. The network devices 200 may include a RF transceiver implemented on a printed circuit board or an RF transceiver IC (RFIC) for tuning. In some embodiments, the RFIC may be one of the Analog Devices AD9361 or the Maxim MAC2829 chips that are available commercially. Radios used by the military generally include the Analog Devices AD9361 chip due to its wide tuning range. In these chips, the maximum total retuning time is less than 70 µs. Accordingly, the retuning time is significantly less than the typical time available during wait time. The number of DSA operations that are performed in the wait time may be a function of the retuning time. For network devices that can retune quickly or when the wait time is longer, more DSA operations may be possible during wait time. FIG. 4A illustrates an embodiment of a process 400 for performing DSA operations during wait time. The process 400 can be implemented by the network devices 200 of FIG. 2. In the illustrated process 400, node-1 is in a non-transmitting mode while node-j is communicating with node-k. While waiting for the ACK message, node-1 can perform multiple DSA operations. As shown in the figure, node-1 can shift to multiple frequencies for sensing and transmitting data. Accordingly, network devices with shorter retuning time may be able to perform multiple DSA operations on multiple channels during the wait time. During RTS, the transmitting node can broadcast the amount of time it wants to reserve for its data transmission. The non-transmitting nodes can use this information to determine exactly how much time they have to perform their DSA operations. FIG. 4B illustrates a MAC underlay signaling process in a TDMA system where time is divided into slots and N slots are grouped into a frame. At the start of each frame, a broadcast messages can be sent out over the network telling other nodes about the slot assignments. Thus, before the start of the frame, every node knows exactly which slot it will be transmitting in and which slot it will be receiving in. Invariably there are slots in which a given node is forced into the wait state during which DSA related activity can take place. FIG. 4C illustrates a MAC underlay signaling process in a Token Passing system where a single token can be passed from one node to another in the network. Any node having the token can send packets. Similar to a CSMA scheme, when the node having the token sends a packet it needs to identify the receiver and it also needs to identify the length of the packet. Thus, when a node reads the packet header and realizes that the packet is not destined for itself, it will go into a wait state for the duration of that packet.

VII. Applicability to Other Access Protocols

FIGS. 3 and 4 were described with respect to CSMA/CA protocol.

However, the MAC underlay process illustrated in FIGS. 3 and 4 is not limited to CSMA/CA protocol. Networking systems operating on a shared medium may require at least some of the nodes in a non-transmitting state during communication of data between a pair of nodes. Accordingly, the non-transmitting nodes may perform secondary operations while waiting for the communication of data to be finished. One of the differences between various MAC protocols may be the wait time. In a network system using TDMA, the slot assignments are broadcasted to all members of the network. Thus, all the nodes in the network know exactly when the MAC-underlay opportunities may be coming up. The secondary operation process discussed above with respect to FIGS. 3 and 4 may also be used with ALOHA protocol.

Figure 5:
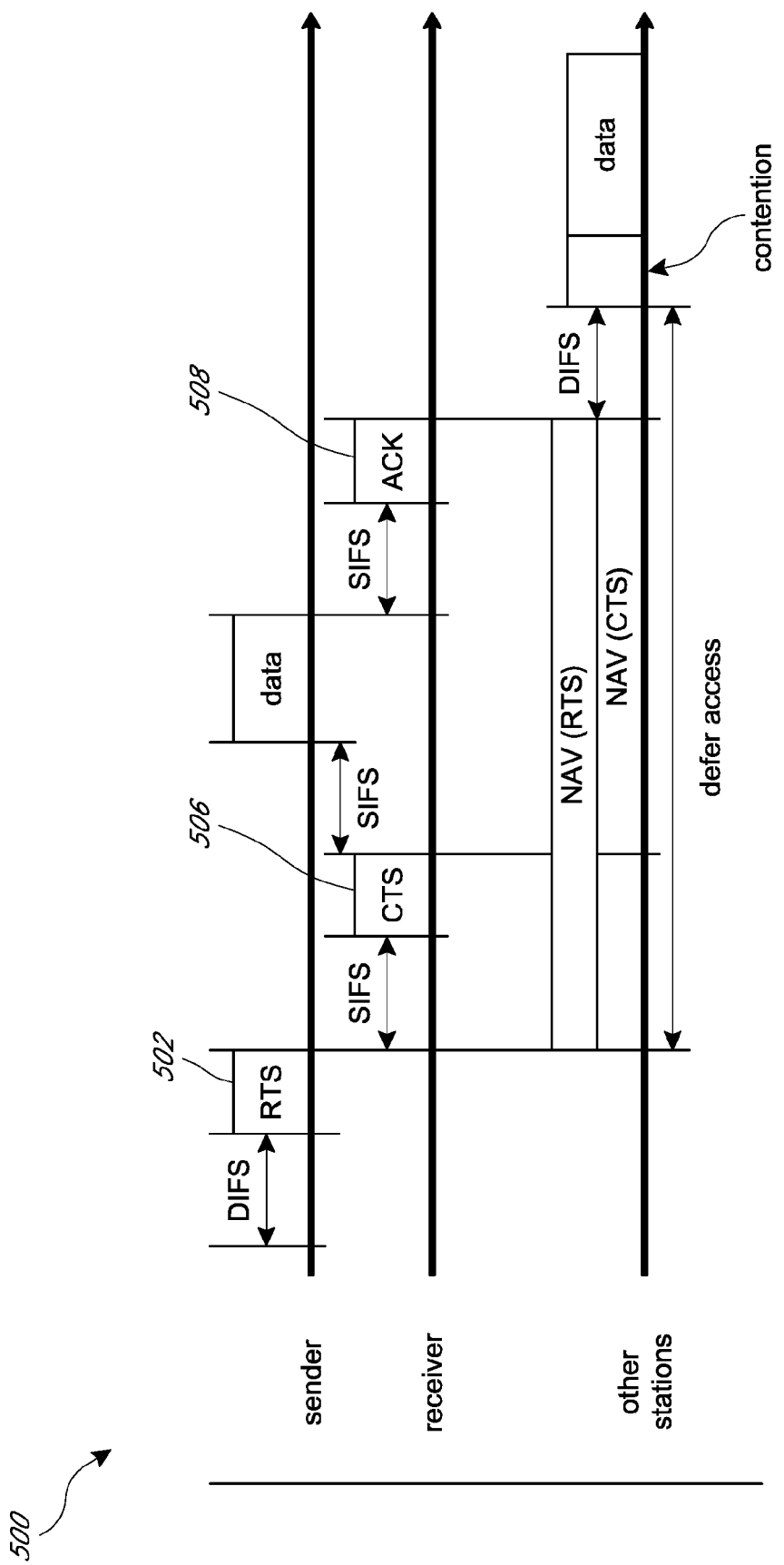
FIG. 5 illustrates a process for MAC underlay signaling in a network system using WiFi protocol. The underlay sensing and signaling can happen during the NAV (RTS) time.

In a WiFi-based system, however, there may be no slots, but instead the WiFi protocol may use time-out intervals such as NAV-RTS and NAV-CTS which include SIFS, DIFS, or other WiFi protocol messages. FIG. 5 illustrates an embodiment of a process 500 for sending and receiving data in a network using WiFi protocol. As shown in FIG. 5, the sender node may transmit a RTS signal at block 502 to the nodes in its neighborhood. The receiving node, in response to the RTS signal, may transmit a CTS signal at block 506. All the other nodes in the neighborhood remain in non-transmitting state until an ACK signal is received at block 508 after completion of data transmission from the sender node to the receiver node. In the illustrated figure, the wait time corresponds to the NAV(RTS) time. Unlike the SRW implementation of CSMA/CA or generic TDMA, there are no slots in a WiFi based CSMA/CA based system. The time-outs corresponding to the data packet, SIFS, and DIFS may vary in time. Accordingly, the NAV(RTS) time may also vary, for example, from 160 µs to 1.2 ms, more than 160 µs, or more than 1.2 ms. As discussed above, the retuning time might be about 70 µs. For a shift-sense-shift operation, about 140 µs may be required for just the two shift operations. As such, there might be some instances, where the node performing one of DSA operations may not be able to return back to the default channel in time for the next contention window. However, the consequences may be minimal. The effect may be felt only if there was a packet intended for a receiving node that did not make it back in time and the sending node had won the contention window while the intended receiving node was still in the shift-sense-shift operation. In this case the sending node may not receive a CTS or an ACK signal, resulting in the network timing out and the contention window may start over. When the second contention window arrives, the receiving node may have completed its shift-sense-shift operation and may be able to respond. Thus, the process of performing secondary operation described herein can be used in a WiFi system with minimal impact to the normal operation of the system.

In some embodiments, the nodes can automatically perform DSA operations even when there is no communication between the nodes of the network. For example, the some or all of the network devices in a network may include a timer so that if there is no traffic being carried by the network, the nodes can perform a DSA operation upon the timer timing out.

While the systems and processes described herein refer to specific protocols, they can be adapted to any protocol where a node is asked to stand-by to allow other nodes to communicate or if there is no traffic in the network. In CSMA and TDMA protocols, the non-transmitting time period may be known. In other protocols, a node can still perform DSA operations when it knows with a certain degree of certainty or probability that it will not be involved in receiving or sending of data in a particular time period.

VIII. Randomized Select and Transmit Implementation

As discussed above, the MAC-underlay signaling process provides a mechanism for performing DSA operation without interfering with the normal operations of a network. For a network topology and interference profile that is static over time, future variations may not be a factor once the nodes have acquired the sensed vectors including, for example, received signal strength indicator (RSSI) from each of the multiple sensed frequencies and distributed these vectors throughout all the nodes in the network. However, the network topology and interference profile may be dynamically changing and the sensed vectors may be subject to variations over time. This could happen for a military use where terrains or other active devices may be dynamically changing. It could also happen in a commercial setting, where WiFi equipment, Bluetooth devices, and cordless phones often enter and exit frequency channels. Furthermore, the DSA protocols may require knowledge of some, or all, of the sensed vectors at each node in the network. Thus, it may be challenging to keep the sensed vectors updated throughout the network.

In some embodiments, the nodes select channels for sensing and transmitting in a randomized order. For example, assume a one-hop network of N nodes, and a set of K candidate channels (center frequencies) for the DSA operated network. A DSA operation can be a single shift-sense-shift or a single shift-signal-shift event. Any node in a non-transmitting state may randomly select one of the K candidate channels. In one embodiment, the nodes may include instructions to perform a DSA sensing operation with a probability of 5/6 and a DSA transmit with a probability of 1/6. In other embodiments, DSA sense may be performed less frequently than DSA transmit. The sense to transmit ratio can be varied according to the network environment parameters, such as interference, available channels, etc. In some embodiments, the node may also transmit sensed vectors received from other nodes in addition to its own sensed vectors.

Since the nodes might be selecting one of the K channels in a randomized order, there might be situations when a node decides to transmit its stored sense-vectors on one the candidate channels, but there may be no other nodes sensing on that channel. In this case, the information may not be transferred across the nodes. However, even the randomized order algorithm may over a number of iterations disseminate the DSA information across the network. The randomized order algorithm can represent the upper bound for the time needed to disseminate sense-vectors. Coordination among nodes may decrease the dissemination time as discussed below.

Figure 6A:
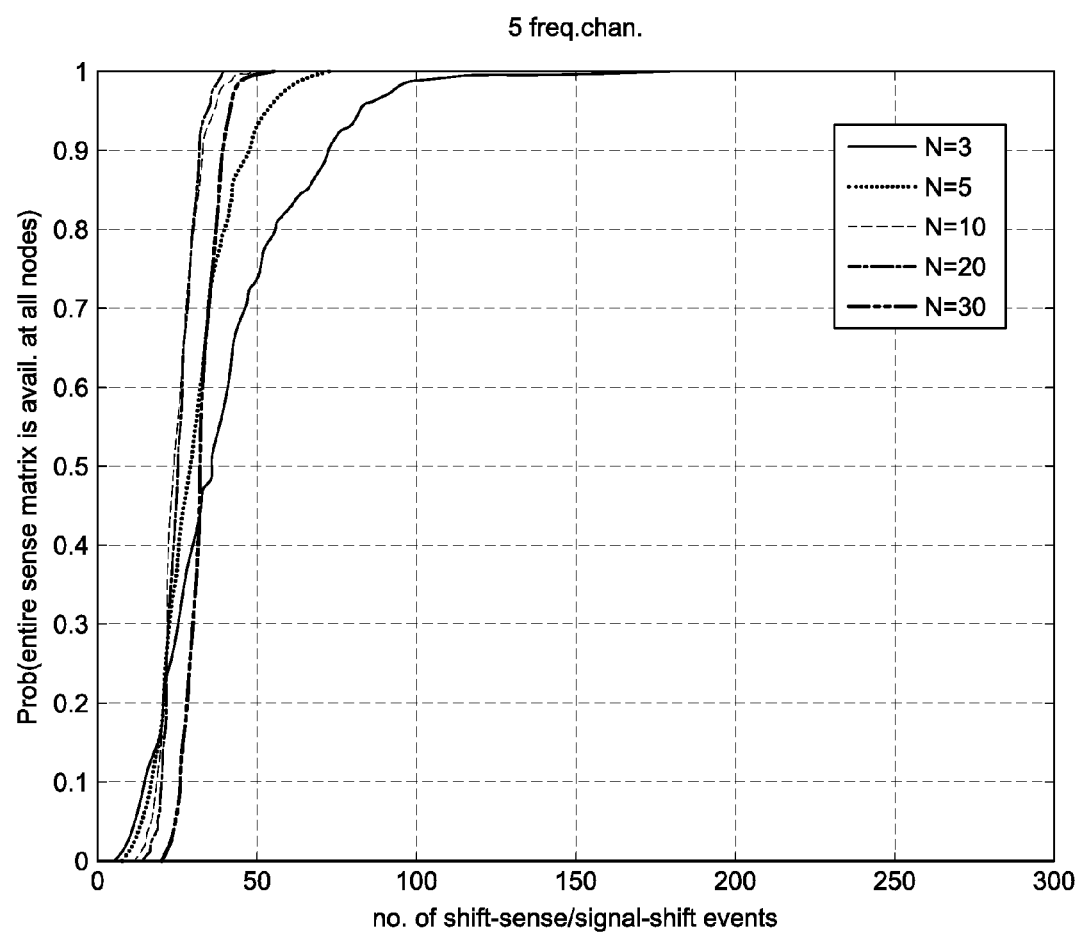
FIGS. 6A and 6B illustrate, for an example network system implementing MAC underlay signaling, the time, measured in the number of shift-sense/transmit-shift events, needed to disseminate all sensed-vectors, respectively.
Figure 6B:
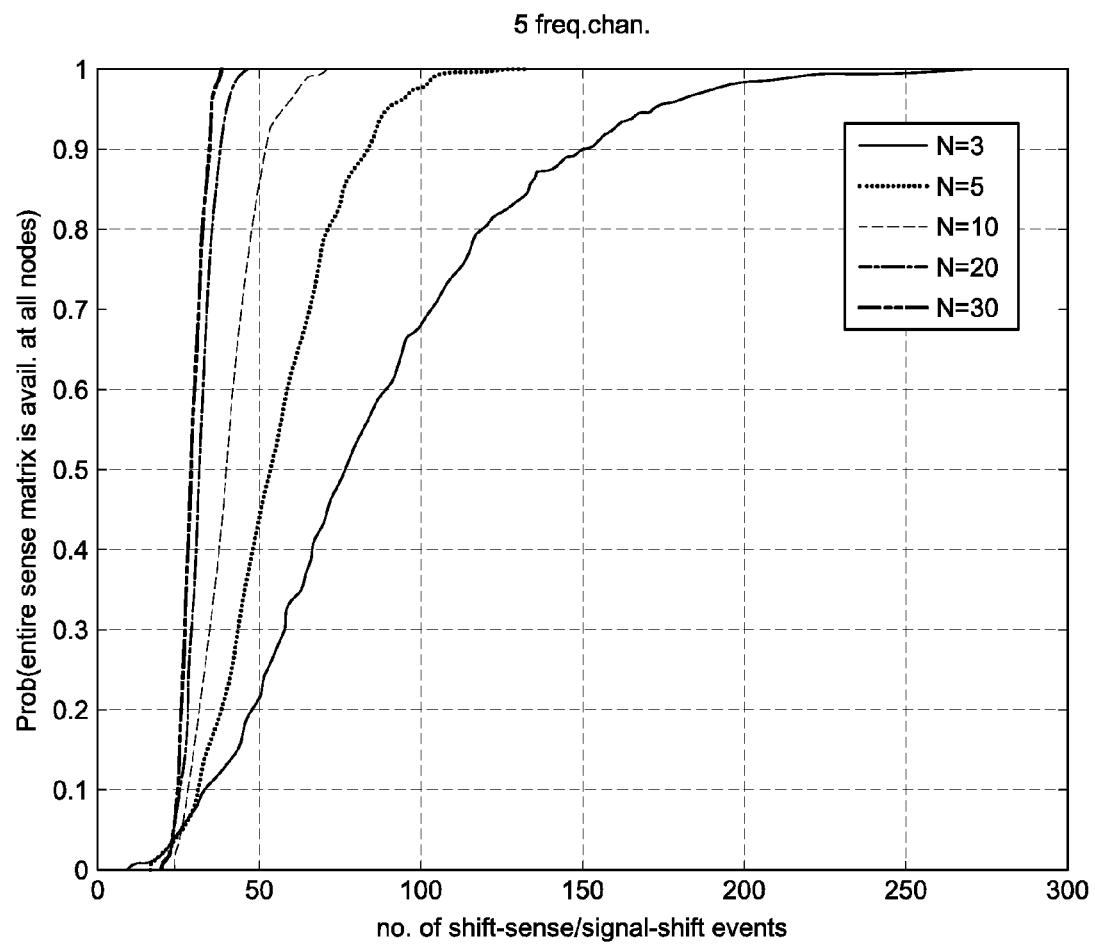

FIGS. 6A and B illustrate the time, measured in the number of shift-sense/transmit-shift events, needed to disseminate all the sensed-vectors within a network of size N with 5 and 10 candidate DSA channels (frequencies), respectively. For example, in a 20 node network with 10 candidate channels, 50 shift-sense/transmit-shift events may be sufficient to disseminate all the sensed-vectors across the network. As illustrated in FIGS. 6A and B, the time needed to disseminate may increase as the number of nodes in the network decrease. Further, dissemination time also may increase with increasing number of channels. In some embodiments, the average shift-sense/transmit-shift event is 2 ms. Accordingly, the corresponding time for complete dissemination of a Nx10 sense matrix among all members is 100 ms for a twenty node (N=20) network and 400 ms for a 3 node (N=3) network.

IX. Example DSA Policy

As discussed above, once the sensed vectors are disseminated to all or majority of the nodes in a network, the nodes may implement a DSA protocol to switch to a secondary channel. DSA protocols may vary in complexity and performance. Some protocols assume perfect information about the status of the network and the interference levels. Implementing the DSA protocols in legacy radios may require some optimization. For example, it may be advantageous in some embodiments to reduce the DSA related messaging overhead by performing DSA processing within the spare processing cycles available on legacy radios such as a Rifleman radio. The following example illustrates operation of a network using the MAC underlay process described herein along with an example DSA protocol.

In this example network, 20 nodes are randomly placed within a 1 km radius. The path loss between all pairs of nodes may be calculated. In this example, the nodes transmit at a fixed power of 30 dBm. The DSA engine implemented by the nodes can choose between 5 alternate channels and move the entire network to the best channel. For each of the candidate frequencies, a single jammer/interference source is randomly placed in the 1 km radius area of operation for simulation purposes. Further, the interference sources turns on and off according to a Markov process, as shown, for example, in Eq. 1, whereby the transition probability are dictated by the average "on-time", $T_{on}$, of the interference source and the duty cycle, $D_c$.

$$p_1 = 1 - \frac{1}{T_{on}}, p_0 = 1 - (1-p_1)\frac{Dc}{1-Dc} \quad \text{(Eq. 1)}$$

In a test scenario, the jammer-on powers can be set to 40 dBm, 40 dBm, 40 dBm, 60 dBm, and 60 dBm for channels f1 through f5, respectively. In this example network, the MAC underlay signaling discussed above was implemented to disseminate the sensing vectors throughout the 20 node network.

In this example, the following DSA policy was used to switch networks to a secondary channel. After every 100 shift-sense/transmit-shift events, each node in the network reviewed its local copy of the network wide channel sense matrix. Then, each node in the network identified a channel based on the least detected interference in that channel. For example, the nodes can sort through the channels based on the interference levels and select a channel which has the lowest interference for that particular node. The entire network can move to a channel that may provide least interference for a majority of the nodes. Since all the nodes in the network have the same copy of the sensed matrix in this example, each node can come up with the same answer for the alternate channel based on using the same algorithm. In the example, the nodes were initially assigned to channel 4.

FIGS. 7A and 7B show the average packet error rate (PER) experienced in the example network as the jammer turns on and off. As illustrated in FIG. 7A, the non-DSA network without the use of secondary DSA operations is devastated by the onset of jamming, which effectively wipes out the entire network. Compared to the non-DSA network in FIG. 7A, the PER performance with the DSA algorithm (discussed above) turned on is illustrated in FIG. 7B. As shown in the figure, DSA protocol with the MAC underlay process described herein can transform a dead network into a usable network.

Figure 8:
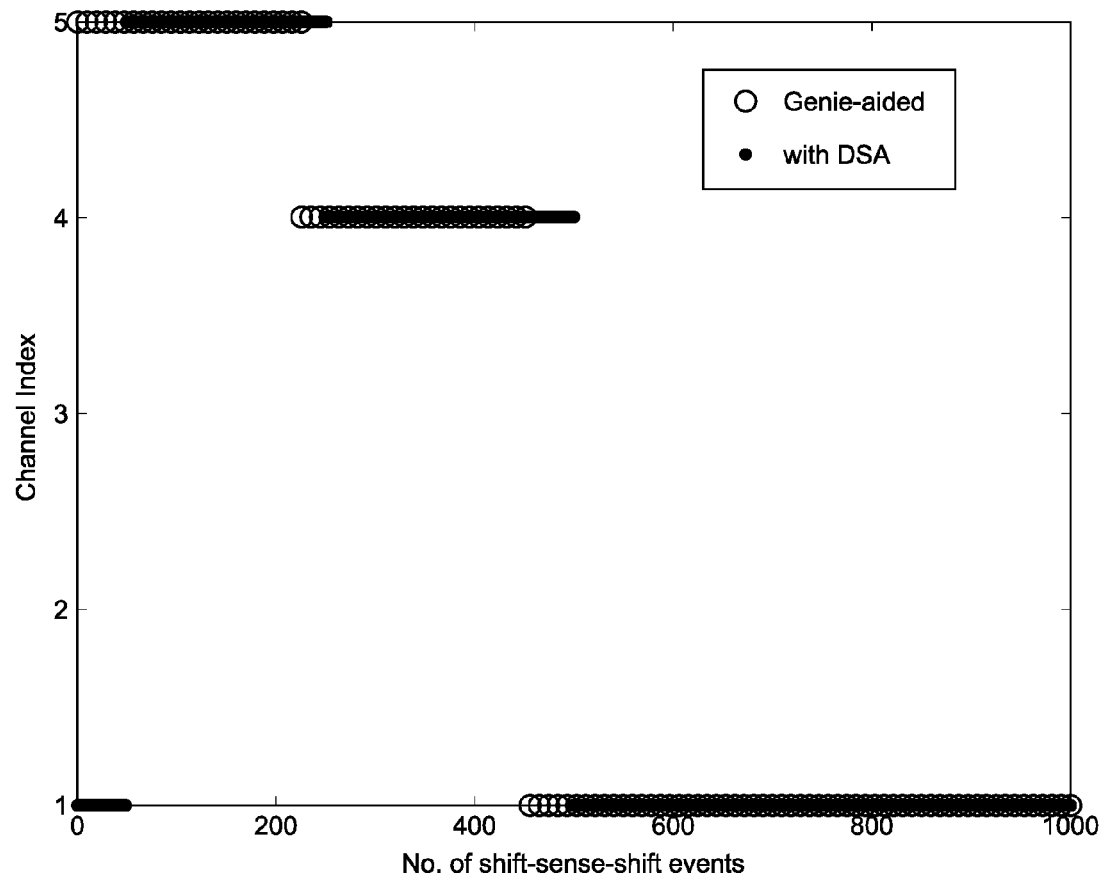
FIG. 8 illustrates, for an example network system, a comparison of channel selection using MAC underlay signaling to that with a Genie-aided system.

Furthermore, a "genie-guided" system can be used to compare whether the algorithm in the above example ended up with the same alternate channel. The channel selection of the example system was compared with the "genie-aided" system where the alternate channel is always known. The results are illustrated in FIG. 8. The example algorithm converged to the alternate channel with a delay of 30 to 80 DSA operations. In some embodiments, the average shift-sense-shift interval for SRW is on the order of 2 ms. Accordingly, the delay corresponds to 60 to 160 ms. Thus, the MAC-underlay approach described herein can significantly improve the performance of a network as shown in FIGS. 7 and 8 with minimal or no impact to the normal operation of the network.

Figure 9:
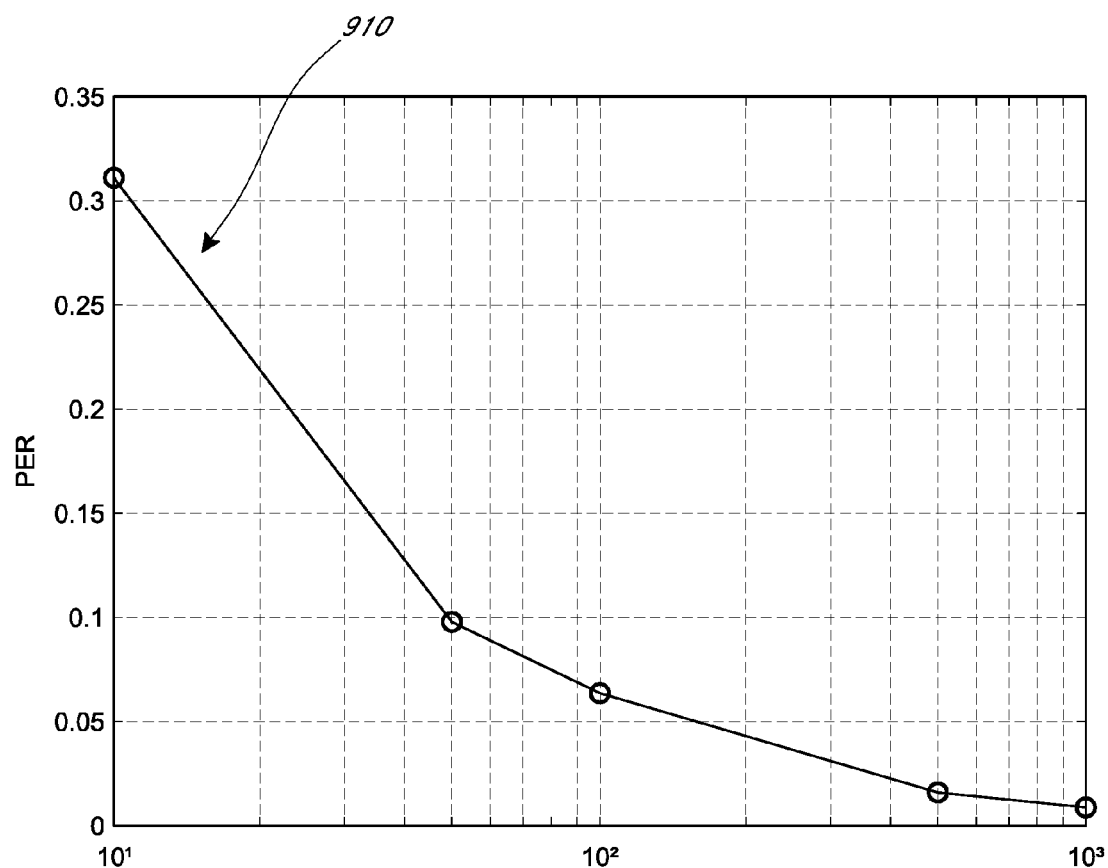
FIG. 9 illustrates performance of an example network using MAC underlay signaling in the presence of dynamic interference changes.

FIG. 9 illustrates performance of the network using the example protocol discussed above in the presence of dynamic interference changes. The x-axis illustrated in FIG. 9 corresponds to the average on-time, $T_{on}$, for the jammer measured in shift-sense-shift intervals. The longer $T_{on}$ is, the more static the interference is. The curve 910 illustrates that as long as the dynamics of the interference/jammer is such that the $T_{on}$ of a particular interference source is 100× higher than the shift-sense-shift interval, then the example protocol discussed above along with the MAC-underlay signaling process can maintain good packet error rate (PER) and overall network throughput rate. Thus, for a 2 ms shift-sense-shift event, the network system may be able to track jammers that come in and out at intervals of 200 ms or longer.

X. Network Operation Parameters

The systems and methods described herein may operate under the following network scenario with the given parameters and specifications. For example, the network of nodes may identify and migrate into a new band when soldiers enter into an area where the pre-assigned frequencies are already occupied. In some cases, a 1 KWatt constant always-on jammer may be flown in on an enemy UAV and may jam 33% of the band at random, but it will be constantly jamming those locations. The jammer may also turn on and off repeatedly (blinking jammer) with a dwell time of, say 10 seconds. In some scenarios, there might be a sudden onset of a friendly jammer in the vicinity of the network. For example, there may be a gentle rise in the interference floor (up to 20 dB increase due to operation of other friendly forces in the vicinity). In some embodiments, there may be 20 nodes in a coverage area. The coverage area may be less than or equal to 1 km, or less than or equal to 4 km, or less than or equal to 10 km, or greater than 10 km. In some embodiments, the systems and methods described herein may maintain network connectivity as long as unoccupied channels exist. Furthermore, the systems and methods described herein may avoid interfering with the operation of friendly networks as long as unoccupied channels exist. Furthermore, in some embodiments, where light to moderate interference exists in the primary band, the system of nodes implementing the processes described herein can deliver a net data throughput improvement of up to 4 times using the spectrum.

XI. MAC Underlay with DSA

Figure 10:
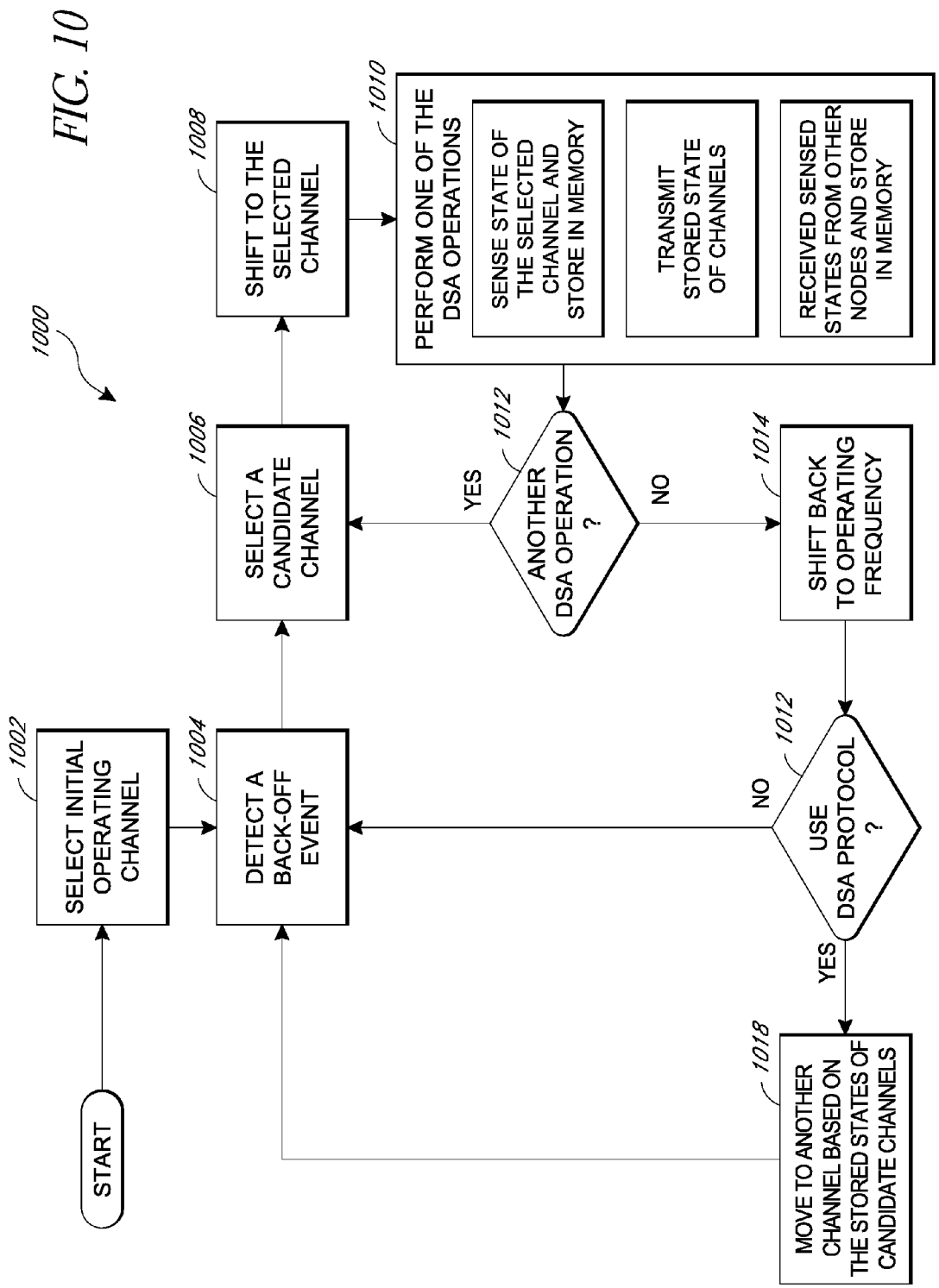
FIG. 10 illustrates an embodiment of a process for MAC underlay signaling and DSA protocol in a network system including multiple nodes described with respect to FIG. 2.

FIG. 10 illustrates an embodiment of a process 1000 for MAC underlay signaling and DSA protocol in a wireless network system including multiple networking devices. The process can be implemented by one or more network device systems 200 described above with respect to FIG. 2.

In some embodiments, the process begins at block 1002 by selecting an initial operating channel. The initial operating channel may be preset into the network device or selected by a user. The wireless network system may include multiple network devices 200 separated by a distance. As discussed above with respect to FIGS. 3 and 4, when one of the network devices in the wireless network systems wins the contention to send a message, a group of nodes (such as neighboring nodes) are forced into an idle (none transmitting) state in the operating channel. Accordingly, at block 1004, a network device 200 may receive a signal that may cause the network device to initiate a non-transmitting mode in a particular channel for a duration of time or until another signal is received.

While the network device 200 may be waiting in the non-transmitting mode, it can perform secondary operations over channels different than the operating channels. For example, block 1006, the network device 200 can select a candidate channel during the non-transmitting mode. In an embodiment, the network device 200 selects the candidate channel in a randomized order. In another embodiment the network device 200 selects the candidate channel based on an algorithm or a preprogrammed order. At block 1008, the network device 200 can shift to the selected channel. In some embodiments, shifting to the selected channel may require retuning to the frequency corresponding to the selected channel.

In the selected channel, the network device 200 can perform one of the DSA operations at block 1010. As discussed above, DSA operations may include sensing state of the selected channel and storing the sensed state into the memory of the network device 200. Further, DSA operations may also include transmitting stored state of channels for that particular node and states of channels received for other nodes. In some embodiments, the network device 200 may receive sensed states from other network devices and store these states in the memory. The network devices 200 can also perform other secondary operations described herein.

In some embodiments, the network device 200 may continue to shift to another channel to perform another secondary operation. Whether the network device 200 performs another shift and DSA operation may depend on the available time in the idle state, which may depend on the particular MAC protocol and other device and system parameters such as retuning time. Thus, based on the parameters of the system and individual network devices, at block 1012, the network device 200 decides whether to do another operation and repeat blocks 1006 to 1008. Otherwise, the network device 200 may shift back to the operating frequency at block 1014.

In some embodiments, at block 1016, the network device 200 may determine whether it needs to switch to another channel. For example, the network device 200 may identify that the operating channel has too much interference. In some embodiments, the network device 200 may review the state of channels after a number of iterations of shift-sense/transmit-shift operations. The number of iterations can be more than or equal to 100. In some embodiments, the number of iterations can be less than 100. The network device 100 may also be able to detect throughput and a decrease in throughput in the current operating channel. Accordingly, at block 1016, the network device 200 can determine whether to implement dynamic spectrum access policy or protocol based on the factors discussed above. If the network device 200 selects to continue with the same operating channel, it can return back to normal operations at 1004 on the same operating channel.

On the other hand, the network device 200 can determine to run a DSA protocol using its DSA engine based on the factors discussed above. At block 1018, the network device 200 can determine whether another channel might be more suitable for transmission in the wireless communication network. In some embodiments, the network device 200 can make that determination at block 1016 instead of 1018. The network device 200 can determine another suitable channel based on the stored states of the channels in the memory. The network device 200 may store states of available channels with respect to each of the network devices 200 in the wireless communication system. In some embodiments, the network device 200 selects a channel that has the least interference across the network devices 200 in the wireless communication system. Once a new channel is selected, the network device 200 can shift or retune to the new channel. The network device 200 can then return to normal operations at block 1004 in a new operating channel.

Thus, in some embodiments, the network devices 200 can use the process 1000 to adapt to changing environment on the fly without requiring a dedicated DSA antenna.

XII. Additional Embodiments

While the embodiments of methods and systems described above may focus on performing DSA operations, the disclosure is not so limited. The methods and systems can be used to perform a number of secondary operations during non-transmitting state. In some embodiments, the systems and methods described herein can be used to sense radar data in WiFi systems. A WiFi system may operate in 2.4 GHz or 5 GHz frequency. Regulatory provisions may require the WiFi systems to check for radar or other signals operating in that frequency before using it for data transmission. Generally, the WiFi systems may include an additional antenna dedicated to sensing radar or the other signals. Using the MAC underlay processes described above, the WiFi system can sense radar or other signals without including an additional dedicated antenna. Thus, in some embodiments, using the processes described herein can save costs and power in a WiFi system.

In some embodiments, the system and methods described herein can also be used to save power in networking systems using shared medium to communicate. For example, during the non-transmitting state, the network devices may power down some of its components to save power resources. Further, the MAC forced silence periods can be used to perform at least one or more of the following secondary operations: entering sleep or low power modes to conserve energy, scanning the spectrum in secondary channels, sending broadcast or other data on a secondary channel, making measurements of spectrum in the current channel with the aim of estimating interference and nulling it using eigen beamnulling or other techniques, making measurements of spectrum in the current channel to sense the noise floor and detect presence of jammer, or transmitting calibration signals on secondary channels so as to calibrate RX and TX phases for TX beamforming. The term "secondary operations" is used in its broad and ordinary sense in the context of radios and includes, for example, at least the operations included in this paragraph and other example operations disclosed in this specification.

As discussed above with respect to FIGS. 7-9, the increase in throughput may be measured by comparing the network system operating in the DSA mode versus non-DSA mode. Accordingly, the effectiveness of systems without dedicated DSA antennas may be monitored by comparing their DSA versus non-DSA operation. Further, in some embodiments, throughput of the network may be monitored as a jammer is introduced in the primary channel. A network implementing DSA may be able to maintain the throughput before, or shortly after, the jammer was introduced by moving into another channel. While the same network without DSA may become unusable.

XIII. Terminology

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for performing secondary operations during data communications over a shared medium, the system comprising:

a first networking device configured to transmit a signal over a primary channel in accordance with a media access control ("MAC") protocol, the signal indicating a transmission request to a second networking device;

a second networking device configured to receive the transmission request from the first networking device over the primary channel; and a third networking device, wherein each of the first networking device, the second networking device, and the third networking device comprise an antenna, a memory, and a hardware processor;

the third networking device configured to:
  receive the transmission request from the first networking device over the primary channel;
  operate in a non-transmitting state in the primary channel in response to receiving the transmission request from first networking device; and
  perform a secondary operation during the non-transmitting state in a secondary channel different from the primary channel, wherein the secondary operation comprises at least one of a plurality of dynamic spectrum access (DSA) operations and the third networking device performs one of the plurality of DSA operations while it is idle in the primary channel to avoid collisions with communications occurring between the first networking device and the second networking device, the DSA operations comprising:
  shift to one of a plurality of secondary frequencies that do not interfere with the signal in the primary channel;
  sense interference in the shifted channel and store the interference corresponding to the shifted channel in the memory; and
  transmit stored interference from the memory to at least some of the networking devices;

wherein at least one of the first, second, or third networking devices is further configured to:
  determine that one of the plurality of secondary frequencies are available for communications based on the transmitted stored interference; and
  shift the primary channel to the available secondary channel when there is interference in the primary channel; and
  wherein a dedicated antenna is not needed for DSA because the third networking device performs the secondary operation while it is idle in the primary channel, thereby enabling dynamic spectrum access without the dedicated antenna.

2. The system of claim 1, wherein the DSA operation comprises receiving sensed data over the secondary channel and storing the received data in the memory of the third networking device.

3. The system of claim 1, wherein the third networking device is further configured to determine interference level in the primary channel.

4. The system of claim 1, wherein the MAC protocol comprises Carrier Sense Multiple Access with Collision Avoidance ("CSMA/CA") protocol.

5. The system of claim 1, wherein the MAC protocol comprises one of the following protocols: Time Domain Multiple Access ("TDMA"), Additive Links on-line Hawaii Area ("ALOHA"), slotted ALOHA, Code Division Multiple Access ("CDMA"), and Frequency Division Multiple Access ("FDMA").

6. A system for performing secondary operations during data communications over a shared medium, the system comprising:
a memory;
an antenna;
one or more hardware processors configured to:
receive a request over a primary channel at the antenna, the request including a message corresponding to a transmission request;
operate in a non-transmitting state in the primary channel based on the received request; and
perform a secondary operation during the non-transmitting state in a secondary channel different from the primary channel,
wherein the secondary operation comprises at least one of a plurality of dynamic spectrum access (DSA) operations comprising:
shifting to one of a plurality of secondary frequencies that do not interfere with the signal in the primary channel;
sensing interference in the shifted channel;
storing the interference corresponding to the shifted channel in the memory; and
transmitting the stored interference from the memory to at least one or more secondary antennas;
determining that one of the plurality of secondary frequencies are available for communications based on the transmitted stored interference; and
shifting the primary channel to the available secondary channel when there is interference in the primary channel;
wherein the same antenna is used for communication in the primary channel and in the secondary channel.

7. The system of claim 6, wherein the secondary operation comprises sensing radar signals.

8. The system of claim 6, wherein the secondary operation comprises reducing power consumption.

9. The system of claim 6, wherein the secondary operation comprises detecting a presence of a jammer.

10. The system of claim 6, wherein the secondary operation comprises transmitting a calibration signal.

11. A method of performing secondary operations during data communications over a shared medium, the method comprising:
receiving a first signal over the primary channel;
staying idle in the primary channel for a first time in response to the first signal; and
performing a secondary operation over a secondary channel in a wireless communications system using a medium access protocol that includes a non-transmitting state during which one or more nodes are otherwise to be silent in the primary channel,
wherein the secondary operation comprises one or more of the following operations:
shifting to one of a plurality of secondary frequencies that do not interfere with the signal in the primary channel;
sensing interference in the shifted channel;
storing the interference corresponding to the shifted channel in the memory; and
transmitting stored interference to at least one or more secondary antennas:
determining that one of the plurality of secondary frequencies are available for communications based on the transmitted stored interference; and
shifting the primary channel to the available secondary channel when there is interference in the primary channel;
wherein a dedicated antenna is not needed for performing the secondary operation.

12. The method of claim 11, wherein the medium access protocol comprises one of the following protocols: CSMA/CA, TDMA, ALOHA, slotted ALOHA, CDMA, and FDMA.

13. The method of claim 11, wherein the secondary operation comprises sensing radar signals.

14. The method of claim 11, wherein the secondary operation comprises reducing power consumption.

15. The method of claim 11, wherein the secondary operation comprises detecting a presence of a jammer.

16. The method of claim 11, wherein the secondary operation comprises transmitting a calibration signal.

* * * * *